April 13, 1937.  R. J. ALTGELT ET AL  2,076,693
DISK HARROW BEARING
Filed March 22, 1933
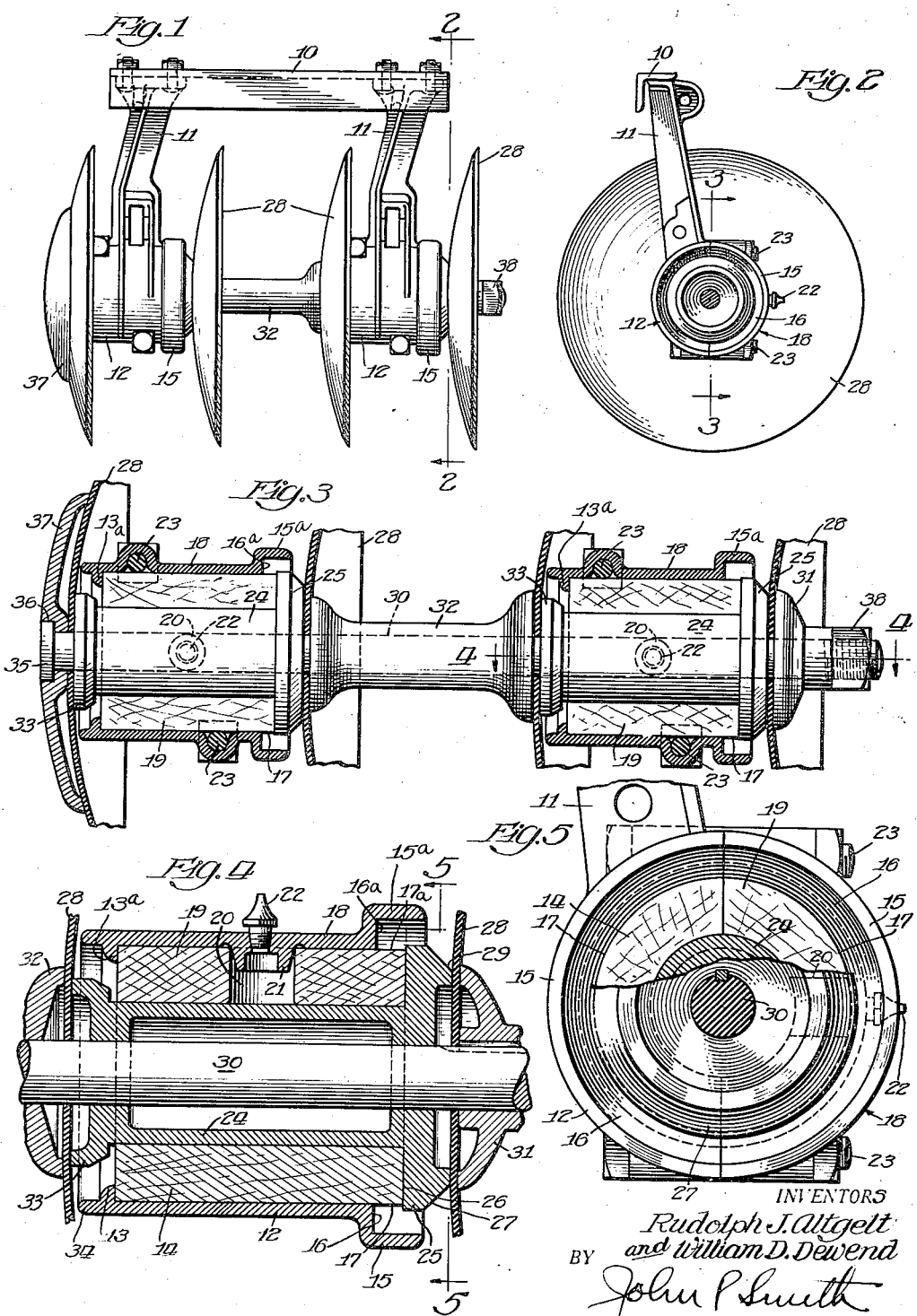
INVENTORS
Rudolph J. Altgelt
and William D. Dewend
BY
John P. Smith
ATTORNEY.

Patented Apr. 13, 1937

2,076,693

UNITED STATES PATENT OFFICE 2,076,693

DISK HARROW BEARING

Rudolph J. Altgelt and William D. Dewend, South Bend, Ind., assignors to Oliver Farm Equipment Company, a corporation of Delaware Application March 22, 1933, Serial No. 662,044

8 Claims. (Cl. 308—19)

The present invention is directed generally to disk harrows, but more particularly to a specific form of disk harrow bearing.

The primary object of the invention is to provide a novel and improved bearing for disk harrows of the wood bushing type which will increase the life of the bearing and reduce to a minimum the number of repairs or replacements now required.

A still further object of the present invention is to provide a novel and improved form of disk-harrow bearing of the wood bushing type in which the wood bushing thereof extends beyond the housing of the bearing in such a manner that the entire end surface of the wood bearing must be worn off before there is any metal to metal contact between the spindle and the housing of the bushing.

A still further object of the invention is to provide a novel and improved form of disk harrow bearing of the wood bushing type in which the housing is so constructed as to form a shield to prevent the dropping of the sand and dirt into the wood bushing and spindle.

A further object of the invention is to provide a novel and improved disk harrow bearing of the wood type construction in which the shield portion of the housing is positioned a substantial distance from the wood bushing and spindle of the disk so as to permit a substantial wearing surface in a radial direction before the flange of the spindle contacts the shield.

A still further object of the invention is to provide a novel and improved disk harrow bearing of the wood type in which the end thrust flange of the spindle is inclined in a direction away from the wood bearing so as to direct the material or dirt away from the wood bushing.

These and other objects are accomplished by providing a construction and arrangement of the various parts in the manner hereinafter described and particularly pointed out in the appended claims.

Referring to the drawing:

Fig. 1 is a rear elevational view of a portion of a disk harrow having embodied therein our improved form of bearing;

Fig. 2 is a cross sectional view taken on the line 2—2;

Fig. 3 is an enlarged cross sectional view taken on the line 3—3 in Fig. 2;

Fig. 4 is an enlarged cross sectional view taken on a horizontal plane of one of the bearings; and Fig. 5 is a cross sectional view taken on the line 5—5 in Fig. 4.

The present invention is directed to a wood bushing bearing for disk harrows and embodies a novel bearing construction in which the wood bushing or wearing surfaces thereof both for the thrust and radial pressure are increased to a maximum so as to extend the lives of the wood bushing or bearing manifold over the constructions heretofore used and thereby eliminates to a considerable extent, the repair or replacement of these bushings.

In illustrating one form of our invention, we have shown the same in connection with fragmentary portions of a harrow frame generally indicated by the reference character 10 to which are connected bearing hangers or brackets 11, which are preferably spaced apart for supporting our improved form of bearing hereinafter described. The lower portions of each of these hangers 11 are provided with semi-circular ends 12. Adjacent one end of these semi-circular portions 12 are inwardly projecting annular flanges 13 against which one edge of each of the semi-circular wood bushings 14 contact. The other ends of the semi-circular portions 12 are provided with enlarged overhanging flanges or shields 15. It will be noted that one end of each of the semi-circular bushings 14 extends beyond the flat surfaces 16 of the semi-circular portions 12 of the hangers 11. Secured to the semi-circular portions 12 are complementary caps generally indicated by the reference character 18, which in turn, are provided with corresponding internal annular flanges 13a against which the complementary semi-circular bushings 19 abut. The other ends of the caps 18 are similarly provided with overhanging annular shields 15a forming the continuation of the shield 15 of the semi-circular portions 12 of each of the hangers. Likewise, a semi-circular complementary wood bushing 19 extends beyond the flat portion 16a as shown at 17a. The bushing 19 is provided with a central bore 20 which extends therethrough and is adapted to receive or have seated therein, an inwardly projecting circular lug 21 which has an aperture therethrough and is adapted to receive in threaded engagement therewith, an oil cup 22 of any well known construction for supplying lubricants to each of the wood bearings. Each of the caps 18 are secured to their complementary semi-circular portions 12 by means of oppositely disposed bolts 23, which extends through aligned apertures in the respective hangers and caps.

Mounted within each of the wood bushings 14 and 19 are hollow spindles generally indicated by the reference character 24. Provided on one end of these spindles are flanges 25 which are of relatively larger diameter than the diameter of the wood bushing 14—19. The inner surfaces of these flanges 25 contact with the outer thrust surfaces of each of the wood bushings as clearly shown at 26, and engage the entire surface thereof, as clearly shown in Figs. 3 and 4 of the drawing. These flanges 25 are provided with a tapered or beveled portion, as shown at 27, which extends from the periphery of the flange 25 to a point adjacent one of the adjacent disks 28, as shown at 29. In this connection, it will be also noted that the space between the periphery of the flange 25 and the inner surface of the shield 15 is considerable, so as to permit wood bushing to have a considerable radial wear before the periphery of the flange 26 contacts with the inner surface of the shield, thereby permitting the wood bushing to have considerable wear before the flange contacts with the shield. The disk 28 is secured to a shaft or bolt 30 by means of a clamping washer 31. The center disks 28 are held in spaced relation with respect to each other and with respect to the outer disk 28 as well as the bearings by means of a spacer spool 32. The spindle 24 is provided with an enlarged and axially extending flange 33 which is adapted to contact with the concave surface of the adjacent disk 28, as shown in Figs. 3 and 4 of the drawing. The semi-circular portions 12 as well as the complementary caps 18 are provided with overhanging portions, as shown at 34, which lie in close proximity to the concave portions of the adjacent disks to substantially shield and cover the bearing portions and prevent dirt and sand and the like from entering the bearing at this point. It will be noted that the bolt or shaft 30 is provided with a head 35 which is adapted to seat itself in the recess 36 formed in the clamping plate 37. This bolt extends through each of the spindles 24 as well as the spool 32 and secures these disks rigidly in position within each of these improved bearings by means of a nut 38.

Summarizing the important features of the invention, it will be readily seen that by arranging the wooden bushing so that the same extends laterally on one end beyond its normal housing or support and that by providing a flange on the spindle which engages the entire end thrust surface of the wooden bushing, a substantial wearing surface is provided to take up the end thrust wear before it is necessary to replace the wooden bearing or until the flange on the spindle contacts the metal of the bearing. It will also be noted that by arranging the shield and having the same offset a considerable distance with respect to the periphery of the flange, a substantial portion of the bearing or bore within the bushing must be worn down before the flange or periphery thereof contacts with the shield. This arrangement reduces to a minimum the necessity of replacing the wooden bushings.

While in the above specification we have described one embodiment which our invention may assume in practice, it will of course, be understood that modifications may be made without departing from the spirit and scope of the invention as expressed in the following claims.

What we claim is our invention and desire to secure by Letters Patent is:

1. A bearing for a disk harrow spindle comprising a bracket having a semi-circular portion, a complementary cap secured to said semi-circular portion, a wood bushing mounted between said cap and said semi-circular portion and having a wearing portion at one end thereof substantially equivalent to the amount said bushing protrudes beyond said cap and said semi-circular portion, and a spindle having a flange engaging the entire end surface of said wood bushing for sustaining the end thrust exerted by said disk, the wearing portion of said wood bushing and said flange sustaining the entire end thrust wear on said bearing.

2. A bearing for a disk harrow spindle comprising a bracket having a semi-circular portion, a complementary cap secured to said semi-circular portion, a wood bushing mounted between and having an end thrust wearing portion extending at one end beyond said semi-circular portion and said cap, an annular shield formed as an integral part of said cap and said semi-circular portion and extending over the end of said extended portion of said bushing, and a spindle having a flange engaging the entire end surface of said wood bushing for sustaining wholly the end thrust wear on said bearing.

3. A bearing for a disk harrow spindle comprising a bracket having a semi-circular portion, a complementary cap secured to said semi-circular portion, semi-circular wood bushings mounted between and having one of their ends extending beyond said cap and said semi-circular portion, a shield spaced from said bushing and carried by said cap and semi-circular portion, and a spindle having a flange engaging the entire end surface of said wood bushing for sustaining the entire end thrust wear on said bearing.

4. A bearing for a disk harrow spindle comprising a bracket having a semi-circular portion, a complementary cap secured to said semi-circular portion, a wood bushing mounted between and having a substantial wearing portion at one end extending beyond said cap and said semi-circular portion, a spindle journaled in said bushing, and a flange formed integrally with said spindle and relatively larger than the end thrust surface of said bushing for engaging the entire end surface of said bushing for sustaining wholly the end thrust wear on said bearing.

5. A bearing for a disk harrow spindle comprising a bracket having a semi-circular portion, a complementary cap secured to said semi-circular portion, a wood bushing mounted between and having one end thereof extending beyond said cap and said semi-circular portion, a spindle journaled in said bushing, a flange carried by said spindle and engaging the entire end surface of said bushing, and a shield spaced from said bushing and overhanging the same carried by said cap and said semi-circular bushing and spaced from the periphery of said flange for permitting a substantial end thrust wear and radial wear on said bushing before said flange contacts with said shield or said cap and said semi-circular portion.

6. A bearing for a disk harrow spindle comprising a bracket having a semi-circular portion, a wood bushing mounted between and extending beyond one end of said cap and said semi-circular portion, a spindle journaled in said bushing, and a flange carried by said spindle for engaging the entire end surface of said bushing for sustaining wholly the end thrust wear on said bearing, said flange having a tapered portion inclined towards the adjacent disk, and a shield extending around the extended portion of said bushing for preventing material from entering said bearings.

7. A bearing for a disk harrow spindle comprising a bracket having a semi-circular portion, a complementary cap secured to said semi-circular portion, two semi-circular wood bushings mounted between and having one of their ends protruding beyond said cap and said semi-circular portion, an annular shield carried by said cap and said semi-circular portion spaced from and substantially enclosing the extended end of said bushing, a spindle journaled in said bushing having an annular flat surface engaging the entire end of said bushing on one side thereof and an inclined surface tapered towards the adjacent disk for directing the material away from the said bearings.

8. A bearing for a disk harrow spindle comprising a bracket having a bearing supporting portion, a wood bushing mounted in said supporting portion, one end of said bushing projecting beyond said supporting portion, and a spindle journaled in said bushing and having a portion thereof engaging the major portion of the end of said bushing whereby the whole end thrust wear is borne by the end of said bushing.

RUDOLPH J. ALTGELT.
WILLIAM D. DEWEND.